United States Patent
Wang et al.

(10) Patent No.: US 7,834,292 B2
(45) Date of Patent: Nov. 16, 2010

(54) METHOD FOR SINGLE SIDE WELDING OF LAMINATE STEEL

(75) Inventors: Pei-Chung Wang, Troy, MI (US); Robert J. Gollehur, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1012 days.

(21) Appl. No.: 11/548,301

(22) Filed: Oct. 11, 2006

(65) Prior Publication Data

US 2008/0087650 A1   Apr. 17, 2008

(51) Int. Cl.
*B23K 11/00* (2006.01)

(52) U.S. Cl. .................... 219/93; 219/91.2; 219/92; 219/117.1; 83/30; 76/107.1; 156/273.9; 156/274.4; 228/173.1; 228/174

(58) Field of Classification Search ........... 219/91.2, 219/91.21, 91.23, 93, 94, 117.1, 118; 83/30, 83/682, 684; 76/107.1; 156/272.2, 273.9, 156/274.4; 228/170, 173.1, 174

See application file for complete search history.

(56) References Cited

U.S. PATENT DOCUMENTS

| 2,703,997 | A | * | 3/1955 | Sowter | 228/115 |
| 2,974,704 | A | * | 3/1961 | Rheingold et al. | 72/327 |
| 3,338,199 | A | * | 8/1967 | Taylor | 413/13 |
| 4,650,951 | A | * | 3/1987 | Koga et al. | 219/118 |
| 4,743,146 | A | * | 5/1988 | Khmelnitsky et al. | 408/221 |

FOREIGN PATENT DOCUMENTS

| JP | 58181487 A | * | 10/1983 |
| JP | 59144585 A | * | 8/1984 |
| JP | 01027784 A | * | 1/1989 |

OTHER PUBLICATIONS

Official English translation of Yokoi (JP 58181487 A); Oct. 1983.*

* cited by examiner

*Primary Examiner*—Stephen J Ralis

(57) ABSTRACT

A method is provided for welding a laminated metal sheet to a workpiece. The laminated metal sheet includes an outer metal sheet and an inner metal sheet bonded together by a polymer material that impedes the flow of weld current. A punch is applied against the outer metal sheet and driven through the laminated metal sheet to create a hole and also create an annular metallic burr that bridges across the polymer material layer between the outer metal sheet and the inner metal sheet. A weld electrode is positioned against the outer metal sheet at the punched hole and weld current is conducted through the first annular metallic burr to create an electric resistance weld between the laminated metal and the workpiece.

17 Claims, 5 Drawing Sheets

METHOD FOR SINGLE SIDE WELDING OF LAMINATE STEEL

FIELD OF THE INVENTION

The present invention relates to a method for creating a single side electric resistance spot weld between a sheet of laminated metal and a workpiece.

BACKGROUND OF THE INVENTION

It is known in modern automobile manufacture to use a laminated steel panel that is formed to shape in a conventional metal stamping press. Laminated steel is manufactured by bonding together a first steel sheet and a second steel sheet by a layer of polymer material that is cured in place between the first and second metal sheets to thereby attach the sheets together. The polymer has viscoelastic properties that dampen the transmission of noise and vibration through the panel.

In the factory, the laminated steel panels can be successfully attached to vehicle structures such as tubular members by squeeze-type resistance spot welding. The factory environment of mass production enables process and quality control procedures that facilitate making of the welds.

However, in the collision repair environment it is often difficult to access the vehicle structure with squeeze type resistance spot welding equipment. Additionally, because the thickness of the steel layers and the polymer layers will vary between vehicle models and between vehicle manufacturers, the typical collision repair shop may experience a wide variation of material thickness which in turn requires a wide range of welder settings, so that the making of test welds may be needed. In addition, the electric resistance spot welding is made difficult by the fact that the polymer material is a dielectric and will not conduct electricity.

The industry standard joining process in the collision repair industry is metal inert gas (MIG) plug welding. In MIG plug welding a hole is cut in the laminated steel and then the MIG weld is formed between the laminated steel and the workpiece that underlies the laminated steel. However the polymer layer tends to melt and mix with the weld.

It would be desirable to provide an improved welding process for attaching a laminated steel panel to a vehicle body member, particularly in making collision repairs to a vehicle.

SUMMARY OF THE INVENTION

A method is provided for welding a laminated metal sheet to a workpiece. The laminated metal sheet includes an outer metal sheet and an inner metal sheet bonded together by a polymer material that impedes the flow of weld current. A punch is applied against the outer metal sheet and driven through the laminated metal sheet to create a hole and also create an annular metallic burr that bridges across the polymer material layer between the outer metal sheet and the inner metal sheet. A weld electrode is positioned against the outer metal sheet at the punched hole and weld current is conducted through the first annular metallic burr to create an electric resistance weld between the laminated metal and the workpiece.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
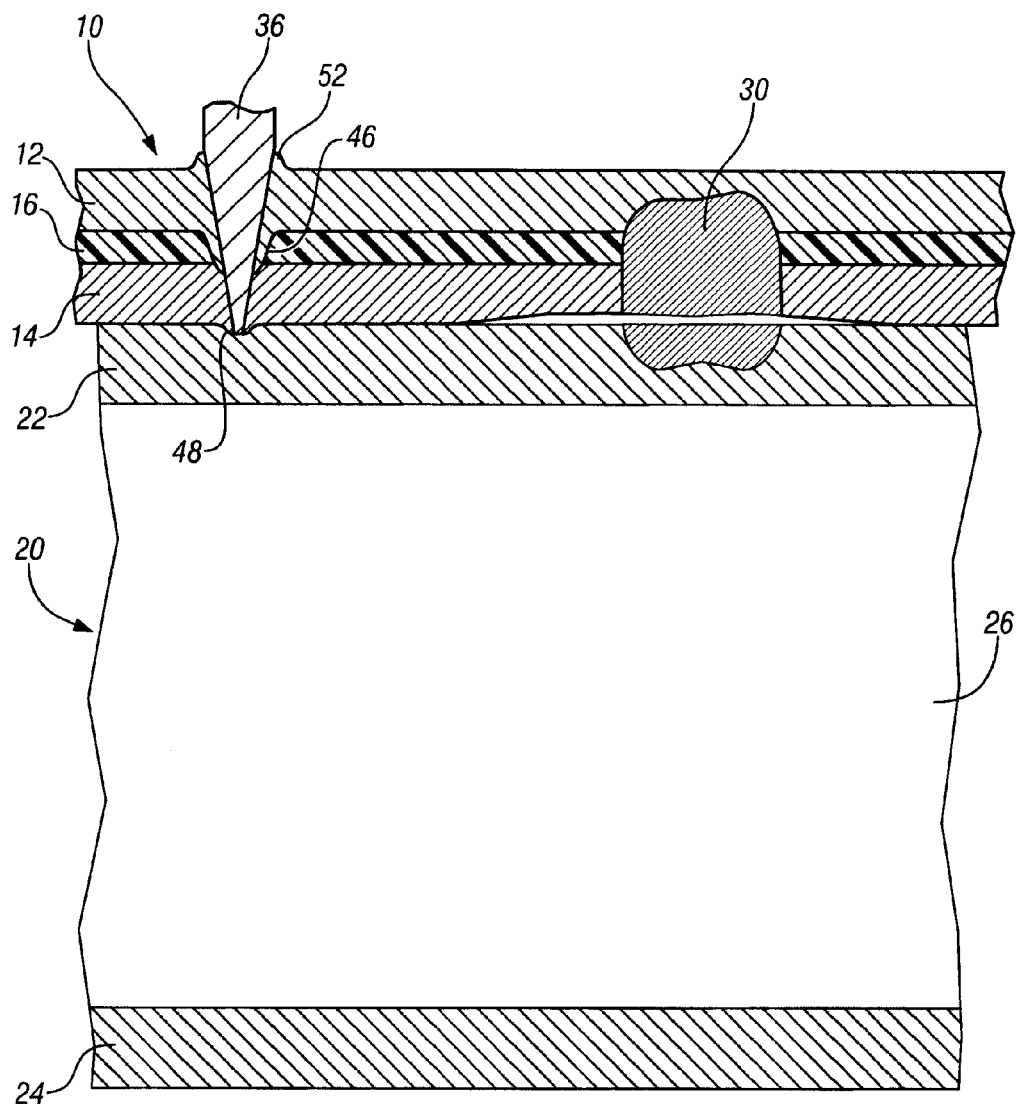
FIG. 1 is a section view showing a sheet of laminated steel attached to a tubular or stamped steel vehicle frame and showing a broken weld and showing a punch that has pierced the laminated steel.

Referring to FIG. 1, a laminated steel panel 10 includes an upper steel sheet 12 and a lower steel sheet 14 with a layer of polymer material 16 interposed there between and bonding the steel sheets together. The total thickness of laminated steel can typically range between 0.8 mm to 3.0 mm. The polymer material is in the range of 0.025 mm-0.12 mm, but is shown as thicker in the drawing for sake of clarity.

A steel tube 20 includes a top wall 22, a bottom wall 24, a back side wall 26, and a front side wall, not shown. As shown in FIG. 1, cracked spot weld 30 is no longer able to attach the laminated steel panel 10 to the steel tube 20. Accordingly a new weld is needed to replace the cracked spot weld 30 and thereby repair the attachment of the laminated steel panel 10 to the steel tube 20.

FIG. 1 shows a punch 36 that has been driven through the laminated steel panel 10, adjacent to the cracked spot weld 30.

Figure 2:
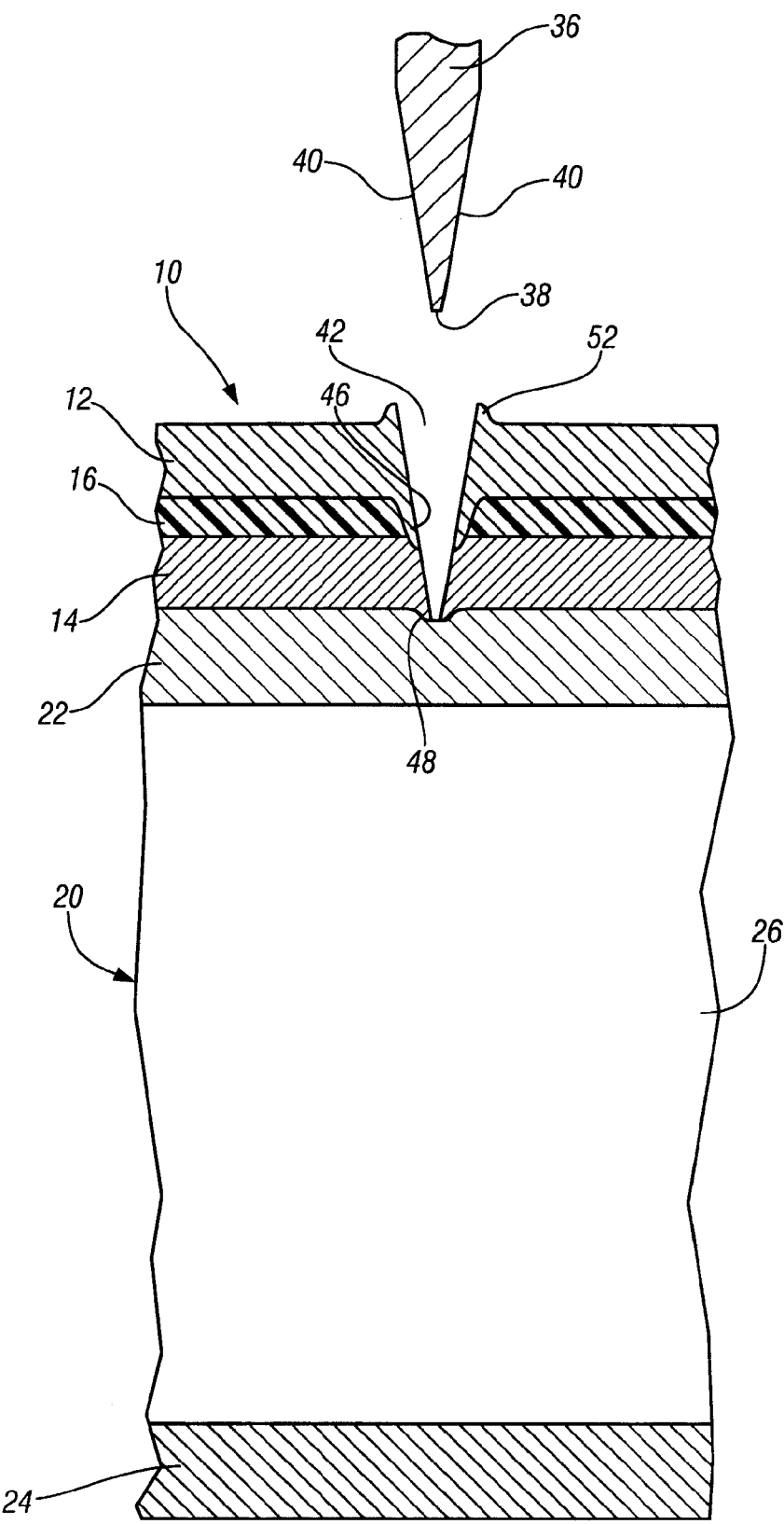
FIG. 2 is a view similar to FIG. 1 but showing that the punch has been withdrawn leaving a hole in the laminated steel; and, FIG. 3 shows that an electrode has applied weld current to form a new weld attaching the laminated steel panel to the tubular steel vehicle frame.

FIG. 2 shows that the punch 36 has been withdrawn and it is seen that the punch has a blunt end 38 and tapered walls 40. The forced insertion of the punch 36 causes the materials of the laminated steel 10 to be displaced both ahead of the blunt end 38 and displaced to the side by the tapered walls 40, so that a punched hole 42 has been punched through the laminated steel 10. Additional displacement occurs upon withdrawal of the punch 36. As seen in FIG. 2, the displaced material includes an annular burr 46 of material from the upper steel sheet 12 that has been carried across the boundary with the polymer material 16 and come into contact with the lower steel sheet 14. Another annular burr 48 is formed beneath the lower steel sheet 14 and seats on the upper wall 22 of the steel tube 20. Another annular burr 52 has formed on the top sheet 12 surrounding the punched hole 42.

Figure 3:
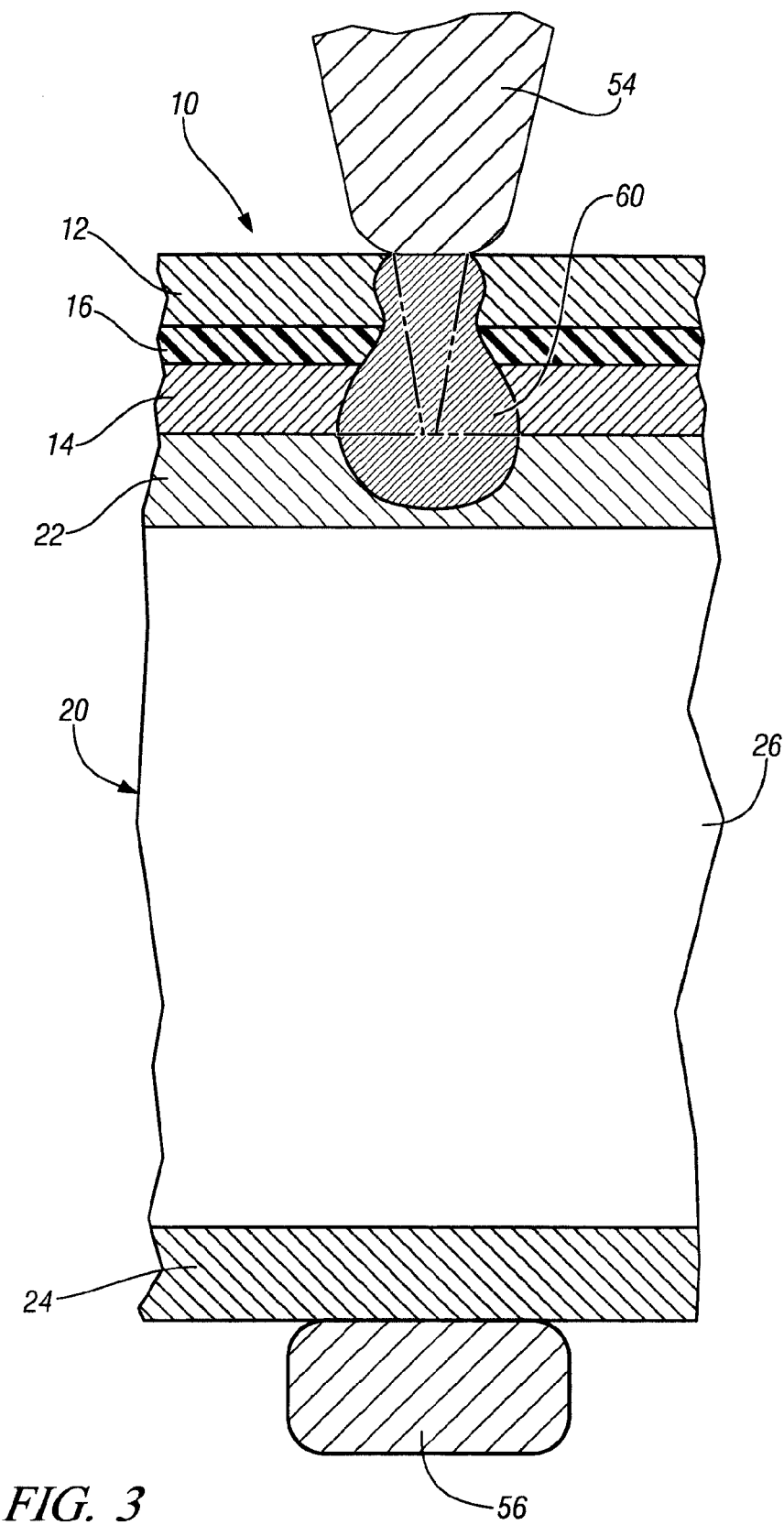

Referring to FIG. 3, it is seen that a welding electrode 54 has been placed on the upper steel sheet 12 and a back-up electrode 56 has been placed against the bottom wall 24 of the steel tube 20. Weld current is passed between the electrode 54 and the back-up electrode 56 and causes the formation of a new electric resistance spot weld 60 that reaches between the upper steel sheet 12, lower steel sheet 14 and the upper wall 22 of the tubular member 20.

The formation of the weld 60 is facilitated by the annular burrs 46, 48 and 52. In particular, the annular burr 46 bridges between the upper steel sheet 12 and the lower steel sheet 14, thus providing a path for electric current flow that would otherwise be insulated by the polymer material 16. The burr 48 engages against the top wall 22 of the tubular member 20 and the burr 52 is engaged by the electrode 54 to thereby concentrate the electrical current in the region closely surrounding the punched hole 42.

Figure 4:
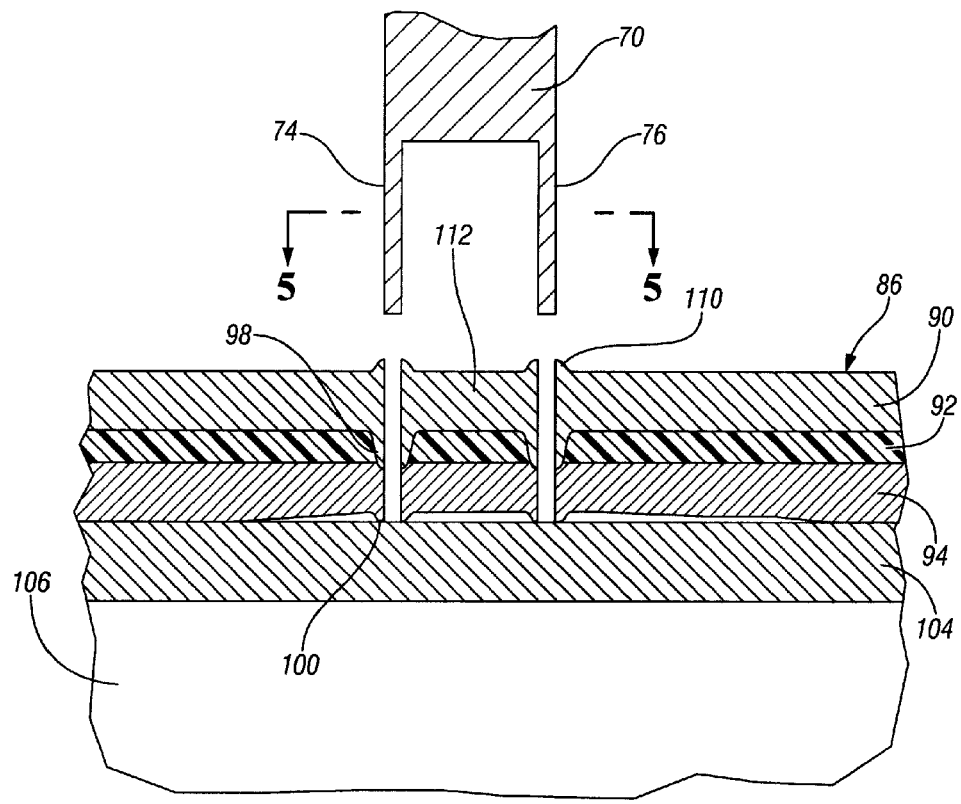
FIG. 4 is a section view showing another embodiment of the invention and shows a hollow punch that has pierced the laminated steel.
Figure 5:
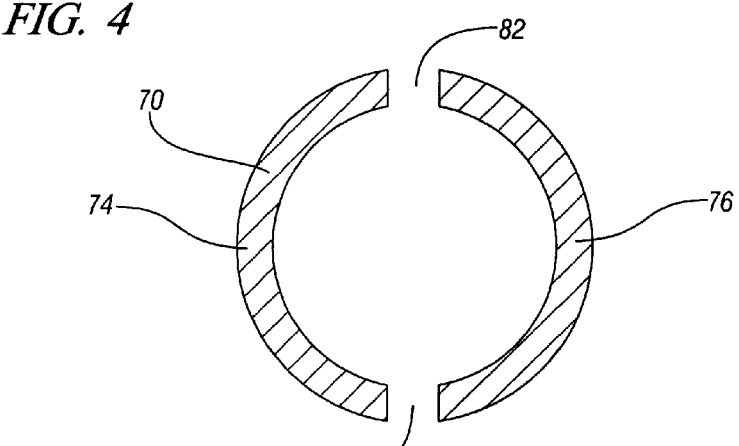
FIG. 5 is a cross section of the hollow punch of FIG. 4.

FIG. 4 shows another embodiment in which a hollow punch 70 is circular in cross section and has a hollow interior. As seen in FIG. 5, the punch 70 is formed of thin walled arc shaped segment walls 74 and 76, having spaces 80 and 82 between the segment walls 74 and 76. Thus as shown in FIG. 5, when the punch 70 is driven into the laminated steel 86, the segment walls 74 and 76 will pierce through the upper steel sheet 90, the layer of polymer material 92, and the lower steel sheet 94.

The piercing operation causes the steel material to be displaced, including the formation of an annular burr 98 formed by material of the upper steel sheet 90 that has been carried across the layer of the polymer material 92 and come into contact with the lower steel sheet 94. Another annular burr 100 is formed beneath the lower steel sheet 94 and seats on the upper wall 104 of steel tube 106. Another annular burr 110 has formed on the top sheet 90 surrounding the punched hole. The spaces 80 and 82 in the punch 70 leave an unpunched isthmus of material so that the punching operation creates two arcuate shaped slots that surround an island 112 of laminated steel panel.

Figure 6:
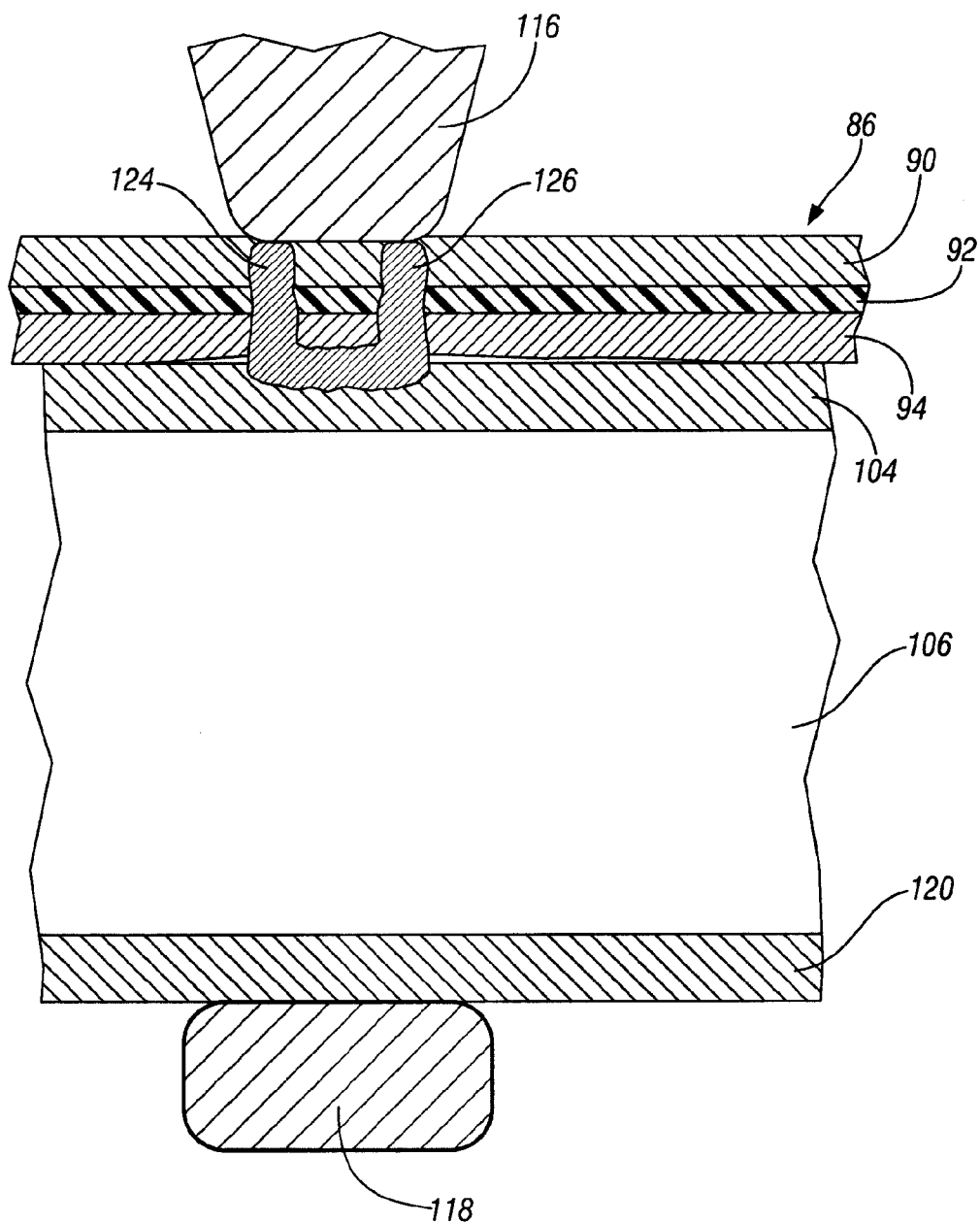
FIG. 6 shows that an electrode has applied weld current to form a new weld attaching the laminated steel panel to the tubular steel vehicle frame.

Referring to FIG. 6, it is seen that a welding electrode 116 has been placed on the upper steel sheet 90 and a back-up electrode 118 has been placed against the bottom wall 120 of the steel tube 106. Weld current is passed between the electrode 116 and the back-up electrode 118 and causes the formation of a new electric resistance spot welds 124 and 126, each of arcuate shape, that reach between the upper steel sheet 90, lower steel sheet 94 and the upper wall 104 of the tubular member 106.

The formation of the welds 124 and 126 is facilitated by the annular burrs 98, 100 and 110. In particular, the annular burr 98 bridges between the upper steel sheet 90 and the lower steel sheet 94, thus providing a path for electric current flow that would otherwise be insulated by the polymer material 92. The burr 100 engages against the top wall 104 of the tubular member 106 and the burr 110 engaged by the electrode 116 to thereby concentrate the electrical current in the region closely surrounding the punched hole.

The foregoing description of the invention is merely exemplary in nature and, thus, variations thereof are intended to be within the scope of the invention. For example, although the aforedescribed method is particularly useful in making repairs in the collision repair shop, it may also be employed in the factory for making original equipment welds. Furthermore, the laminated metal plate may be of steel, aluminum or other metals. The method can be used to weld a laminated metal panel to any workpiece, and is not limited to welding to a tubular automotive structure.

What is claimed is:

1. A method for making an electric resistance weld between a workpiece and a laminated metal sheet having an outer metal sheet and an inner metal sheet bonded together by a polymer material, in which the workpiece has been previously welded to the laminated metal sheet so that inner metal sheet is already positioned against and attached to the workpiece and therefore not accessible to tooling comprising:

applying a punch against the outer metal sheet and driving the punch through the laminated metal sheet and against the workpiece so that a hole is created by the progressive forced insertion of the punch through the outer metal sheet, the polymer material and the inner sheet of the laminated metal sheet, said forced insertion of the punch causing displacement of material from the outer metal sheet to form a first annular metallic burr that bridges across the polymer material layer between the outer metal sheet and the inner metal sheet thus providing a path for electrical current flow between the outer metal sheet and the inner metal sheet that would otherwise be insulated from each other by the polymer material layer;

and positioning a weld electrode against the outer metal sheet at the punched hole and applying weld current that is conducted directly to the outer metal sheet and then through the first annular metallic burr to inner metal sheet to create an electric resistance weld between the laminated metal and the workpiece.

2. The method of claim 1 further characterized by the forced insertion of the punch displacing metal from inner metal sheet and thereby forming a second annular metallic burr that engages the workpiece to concentrate the weld current in a region closely surrounding the punched hole.

3. The method of claim 1 further characterized by the forced insertion of the punch displacing material from the outer metal sheet and forming a third annular metallic burr at a surface of the outer metal sheet, and upon said positioning of the weld electrode the third annular burr is engaged by the weld electrode to concentrate the weld current applied to the outer metal sheet in the region surrounding the punched hole.

4. The method of claim 1 further characterized by the forced insertion of the punch displacing metal from the inner metal sheet and forming a second annular metallic burr that surrounds the punched hole and engages the workpiece to concentrate the weld current in a region surrounding the punched hole and the forced insertion and then subsequent withdrawal of the punch also displacing metal from the inner metal panel and forming a third annular metallic burr at a surface of the outer metal sheet and that is engaged by the weld electrode to concentrate the weld current in the region surrounding the punched hole.

5. The method of claim 1 in which the punch has a blunt end.

6. The method of claim 1 in which the punch has tapered walls.

7. The method of claim 1 in which the punch has tapered walls and a blunt end.

8. The method of claim 1 in which the punch is of a hollow cylindrical shape to form an annular hole through the laminated metal panel.

9. The method of claim 8 in which the punch is formed of punch walls having a plurality of arc shaped wall segments with a space therebetweeen.

10. A method for making an electric resistance weld between a workpiece and an abutting laminated metal sheet having an outer metal sheet and an inner metal sheet bonded together by a polymer material layer, in which the workpiece has been previously welded to the laminated metal sheet so that inner metal sheet is already positioned against and attached to the workpiece and therefore not accessible to tooling comprising:

applying a punch against the outer metal sheet and punching a hole through the laminated metal sheet by forced insertion of the punch and the progressive displacement of material ahead of the punch as the punch progressively punches through the outer metal sheet and then the polymer material layer and then the inner metal sheet and into contact with the workpiece, so that metal displaced by the punching forms a first annular metallic burr of metal displaced from the outer metal sheet that bridges across the polymer material layer to create a path of electrical contact between the outer sheet and the inner sheet; and metal displaced from the inner metal sheet forms a second annular metallic burr that engages the workpiece;

and positioning a weld electrode against the outer sheet at the punched hole and applying weld current that is conducted through the first annular metallic burr and through the second annular metallic burr to create an electric resistance weld between the laminated metal sheet and the workpiece.

11. The method of claim 10 in which the punch is a hollow cylindrical shape and forms an annular hole through the laminated metal panel.

12. The method of claim 8 in which the punch is of a hollow cylindrical shape and is formed of punch walls having a plurality of arc shaped wall segments with a space therebetweeen.

13. The method of claim 10 in which the punch has a blunt end.

14. The method of claim 10 in which the punch has tapered walls.

15. The method of claim 10 in which the punch has tapered walls and a blunt end.

16. The method of claim 10 further characterized by the punching forming a third annular metallic burr at the surface of the outer metal sheet that is engaged by the weld electrode to concentrate the weld current in the region surrounding the punched hole.

17. A method for making an electric resistance weld between a workpiece and a laminated metal sheet having an outer metal sheet and an inner metal sheet bonded together by a polymer material, in which the workpiece has been previously welded to the laminated metal sheet so that inner metal sheet is already positioned against and attached to the workpiece and therefore not accessible to tooling comprising:

providing a punch having tapers walls and a blunt end;

driving the punch through the laminated metal sheet so that a hole is created through the laminated metal sheet, displacing metal from the outer metal sheet and forming a first annular metallic burr that bridges across the polymer material layer between the outer metal sheet and the inner metal sheet, displacing metal from the inner metal sheet and forming a second annular metallic burr that engages the workpiece, displacing metal from a surface of the outer metal sheet forming a third annular metallic burr at the surface of the outer metal sheet;

and positioning a weld electrode against the outer metal sheet at the punched hole and applying weld current that is concentrated in the region of the punched hole by the second and third annular burrs and conducted between the outer metal sheet and the inner metal sheet by the first annular burr to thereby created a weld between the laminated metal sheet and the workpiece.

* * * * *